(12) United States Patent
Lee et al.

(10) Patent No.: US 11,637,350 B2
(45) Date of Patent: Apr. 25, 2023

(54) SEPARATOR HAVING POROUS COATING LAYER INCLUDING PVDF-HFP BLOCK COPOLYMER AND METHOD FOR MANUFACTURING SAME

(71) Applicant: LG CHEM, LTD., Seoul (KR)

(72) Inventors: Jong-Yoon Lee, Daejeon (KR); So-Mi Jeong, Daejeon (KR); Dong-Wook Sung, Daejeon (KR); Dae-Sung Jang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 311 days.

(21) Appl. No.: 16/959,275

(22) PCT Filed: Oct. 14, 2019

(86) PCT No.: PCT/KR2019/013448
§ 371 (c)(1),
(2) Date: Jun. 30, 2020

(87) PCT Pub. No.: WO2020/080774
PCT Pub. Date: Apr. 23, 2020

(65) Prior Publication Data
US 2021/0057704 A1 Feb. 25, 2021

(30) Foreign Application Priority Data
Oct. 15, 2018 (KR) .................. 10-2018-0122825

(51) Int. Cl.
*H01M 50/449* (2021.01)
*H01M 50/403* (2021.01)
(Continued)

(52) U.S. Cl.
CPC ........ *H01M 50/449* (2021.01); *C09D 127/16* (2013.01); *H01M 10/0525* (2013.01);
(Continued)

(58) Field of Classification Search
CPC ............ H01M 50/449; H01M 50/403; H01M 50/446; H01M 50/411
(Continued)

(56) References Cited

U.S. PATENT DOCUMENTS 6,506,523 B1   1/2003   Hatazawa et al.
10,590,224 B2  3/2020   Mitchell et al.
(Continued)

FOREIGN PATENT DOCUMENTS

CN   107849200 A   3/2018
CN   108352486 A   7/2018
(Continued)

OTHER PUBLICATIONS

International Search Report for PCT/KR2019/013448 dated Jan. 22, 2020.
(Continued)

*Primary Examiner* — Sean P Cullen
(74) *Attorney, Agent, or Firm* — Birch, Stewart, Kolasch & Birch, LLP

(57) ABSTRACT

A separator for an electrochemical device including a porous polymer substrate; and a porous coating layer formed on at least one surface of the porous polymer substrate, wherein the porous coating layer comprises inorganic particles and a binder polymer positioned on at least a part of a surface of individual inorganic particles to connect and fix the inorganic particles with one another. The binder polymer comprises a first block having repeating units and a second block having repeating units. A method for manufacturing the same is also provided. The separator shows low resistance, improved adhesion to an electrode and improved swelling property with a solvent.

14 Claims, 2 Drawing Sheets

(51) Int. Cl.
 *H01M 50/446* (2021.01)
 *H01M 50/411* (2021.01)
 *C09D 127/16* (2006.01)
 *H01M 10/0525* (2010.01)
 *H01M 50/443* (2021.01)
 *C08K 3/04* (2006.01)

(52) U.S. Cl.
 CPC ....... *H01M 50/403* (2021.01); *H01M 50/411* (2021.01); *H01M 50/443* (2021.01); *H01M 50/446* (2021.01); *C08K 3/04* (2013.01)

(58) Field of Classification Search
 USPC ........................................ 429/144, 251, 254
 See application file for complete search history.

(56) References Cited

U.S. PATENT DOCUMENTS

| | | | |
|---|---|---|---|
| 10,811,654 | B2 | 10/2020 | Honda et al. |
| 2002/0018936 | A1 | 2/2002 | Suzuki et al. |
| 2003/0186112 | A1 | 10/2003 | Akashi et al. |
| 2013/0266872 | A1 | 10/2013 | Adamson et al. |
| 2015/0104691 | A1* | 4/2015 | Nakamura ........ H01M 10/0525 429/150 |
| 2016/0164060 | A1 | 6/2016 | Zhang et al. |
| 2017/0069894 | A1 | 3/2017 | Ishihara et al. |
| 2017/0338460 | A1* | 11/2017 | Kim ............................ C09J 7/30 |
| 2018/0065105 | A1 | 3/2018 | Song et al. |

FOREIGN PATENT DOCUMENTS

| | | | | |
|---|---|---|---|---|
| CN | 108711605 A | * | 10/2018 | ........ H01M 10/0525 |
| JP | 2013-537360 A | | 9/2013 | |
| JP | 2017-54594 A | | 3/2017 | |
| KR | 10-2012-0069314 A | | 6/2012 | |
| KR | 10-2013-0137390 A | | 12/2013 | |
| KR | 10-1581422 B1 | | 12/2015 | |
| KR | 10-2016-0117962 A | | 10/2016 | |
| KR | 10-2017-0044074 A | | 4/2017 | |
| KR | 2017077020 A | * | 7/2017 | ............ C08F 259/08 |
| WO | WO 2018/011244 A1 | | 1/2018 | |

OTHER PUBLICATIONS

European Search Report issued in European Patent Application No. 19 87 3664.7, dated Apr. 16, 2021.

\* cited by examiner

SEPARATOR HAVING POROUS COATING LAYER INCLUDING PVDF-HFP BLOCK COPOLYMER AND METHOD FOR MANUFACTURING SAME

TECHNICAL FIELD

The present disclosure relates to a separator applicable to an electrochemical device, such as a lithium secondary battery, and a method for manufacturing the same.

The present application claims priority to Korean Patent Application No. 10-2018-0122825 filed on Oct. 15, 2018 in the Republic of Korea, the disclosures of which are incorporated herein by reference.

BACKGROUND ART

Recently, energy storage technology has been given an increasing attention. Efforts into research and development for electrochemical devices have been actualized more and more, as the application of energy storage technology has been extended to energy for cellular phones, camcorders and notebook PC and even to energy for electric vehicles. In this context, electrochemical devices have been most spotlighted. Among such electrochemical devices, development of rechargeable secondary batteries has been focused. More recently, active studies have been conducted about designing a novel electrode and battery in order to improve the capacity density and specific energy in developing such batteries.

Among the commercially available secondary batteries, lithium secondary batteries developed in the early 1990's have been spotlighted, since they have a higher operating voltage and significantly higher energy density as compared to conventional batteries, such as Ni-MH, Ni—Cd and sulfuric acid-lead batteries using an aqueous electrolyte.

Although such electrochemical devices have been produced from many production companies, safety characteristics thereof show different signs. Evaluation and securement of safety of such electrochemical devices are very important. The most important consideration is that electrochemical devices should not damage users upon their malfunction. For this purpose, safety standards strictly control ignition and smoke emission in electrochemical devices. With regard to safety characteristics of electrochemical devices, there is great concern about explosion when an electrochemical device is overheated to cause thermal runaway or perforation of a separator. Particularly, a polyolefin-based porous substrate used conventionally as a separator for an electrochemical device shows a severe heat shrinking behavior at a temperature of 100° C. or higher due to its material property and a characteristic during its manufacturing process, including orientation, thereby causing a short-circuit between a cathode and an anode.

To solve the above-mentioned safety problems of an electrochemical device, there has been suggested a separator having a porous coating layer formed by applying a mixture of an excessive amount of inorganic particles with a binder polymer onto at least one surface of a porous substrate having a plurality of pores.

Meanwhile, an adhesive layer has been introduced to the porous coating layer in order to increase the adhesion between a separator and an electrode. For example, the binder polymer contained in the binder coating layer includes polyvinylidene fluoride-hexafluoropropylene.

However, as high-energy density and high-output batteries are required, there is still a need for a separator which forms an electrode adhesive layer even with a small thickness and does not cause an increase in battery resistance.

DISCLOSURE

Technical Problem

The inventors of the present disclosure have conduced intensive studies to solve the problems of the related art, and found a separator which uses a desired binder polymer, and thus has improved adhesion to an electrode, maintains resistance characteristics at an adequate level or higher and shows excellent swelling property with a solvent. The present disclosure is based on this finding.

Technical Solution

The present disclosure is directed to providing a separator which has excellent adhesion to an electrode, does not cause an increase in battery resistance, and thus is suitable for a separator for an electrochemical device, and a method for manufacturing the same.

In one aspect of the present disclosure, there is provided a separator as defined in any one of the following embodiments.

According to the first embodiment of the present disclosure, three is provided a separator for an electrochemical device which includes:

a porous polymer substrate; and a porous coating layer formed on at least one surface of the porous polymer substrate, wherein the porous coating layer comprises inorganic particles and a binder polymer positioned on at least a part of the surface of the individual inorganic particles to connect and fix the inorganic particles with one another;

wherein the binder polymer includes a block copolymer including a first block having repeating units represented by the following Chemical Formula 1 and a second block having repeating units represented by the following Chemical Formula 2, and the content of the block copolymer is 50 parts by weight or more based on 100 parts by weight of the total content of the binder polymer:

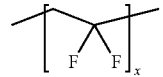

[Chemical Formula 1]

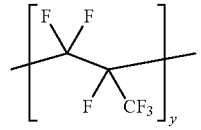

[Chemical Formula 2]

(wherein each of x and y independently represents an integer of 1 or more).

According to the second embodiment of the present disclosure, there is provided the separator for an electrochemical device as defined in the first embodiment, wherein the block copolymer is a copolymer polymerized from the first block and the second block at a weight ratio of the first block to the second block of 95:5-80:20.

According to the third embodiment of the present disclosure, there is provided the separator for an electrochemical device as defined in the first or the second embodiment, wherein the block copolymer has a weight average molecular weight of 100,000-900,000.

According to the fourth embodiment of the present disclosure, there is provided the separator for an electrochemical device as defined in any one of the first to the third embodiments, wherein the weight ratio of the inorganic particles to the binder polymer is 50:50-99:1.

According to the fifth embodiment of the present disclosure, there is provided the separator for an electrochemical device as defined in any one of the first to the fourth embodiments, wherein the block copolymer is a copolymer polymerized from the first block and the second block at a weight ratio of the first block to the second block of 95:5-90:10.

According to the sixth embodiment of the present disclosure, there is provided the separator for an electrochemical device as defined in any one of the first to the fifth embodiments, wherein the block copolymer has a weight average molecular weight of 570,000-900,000.

According to the seventh embodiment of the present disclosure, there is provided the separator for an electrochemical device as defined in any one of the first to the sixth embodiments, wherein the block copolymer includes the first block having a weight average molecular weight of 540,000-860,000 and the second block having a weight average molecular weight of 30,000-180,000 at a weight ratio of the first block to the second block of 95:5-90:10.

According to the eighth embodiment of the present disclosure, there is provided the separator for an electrochemical device as defined in any one of the first to the seventh embodiments, wherein the porous polymer substrate is a polyolefin-based porous polymer film substrate or a porous polymer non-woven web substrate.

According to the ninth embodiment of the present disclosure, there is provided the separator for an electrochemical device as defined in the eighth embodiment, wherein the polyolefin-based porous polymer film substrate includes polyethylene, polypropylene, polybutylene, polypentene, or at least two polymers of them.

According to the tenth embodiment of the present disclosure, there is provided the separator for an electrochemical device as defined in any one of the first to the ninth embodiments, wherein the binder polymer is the block copolymer.

In another aspect of the present disclosure, there is also provided a method for manufacturing a separator as defined in any one of the following embodiments.

According to the eleventh embodiment of the present disclosure, there is provided a method for manufacturing a separator for an electrochemical device, including the steps of:

(S1) preparing a porous polymer substrate; and (S2) applying slurry for forming a porous coating layer including an organic solvent, a plurality of inorganic particles and a binder polymer onto at least one surface of the porous polymer substrate and drying the porous polymer substrate coated with the slurry to form a porous coating layer, wherein the binder polymer includes a block copolymer including a first block having repeating units represented by the following Chemical Formula 1 and a second block having repeating units represented by the following Chemical Formula 2, and wherein the content of the block copolymer is 50 parts by weight or more based on 100 parts by weight of the total content of the binder polymer:

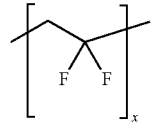

[Chemical Formula 1]

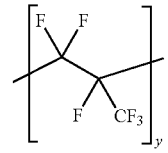

[Chemical Formula 2]

(wherein each of x and y independently represents an integer of 1 or more).

According to the twelfth embodiment of the present disclosure, there is provided the method for manufacturing a separator for an electrochemical device as defined in the eleventh embodiment, wherein the block copolymer is a copolymer polymerized from the first block and the second block at a weight ratio of the first block to the second block of 95:5-80:20.

According to the thirteenth embodiment of the present disclosure, there is provided the method for manufacturing a separator for an electrochemical device as defined in the eleventh embodiment, wherein the organic solvent includes acetone, tetrahydrofuran, methylene chloride, chloroform, dimethyl formamide, N-methyl-2-pyrrolidone, methyl ethyl ketone, cyclohexane, or a mixture of two or more of them.

According to the fourteenth embodiment of the present disclosure, there is provided the method for manufacturing a separator for an electrochemical device as defined in any one of the eleventh to the thirteenth embodiments, wherein the binder polymer is the block copolymer.

In still another aspect of the present disclosure, there is provided an electrochemical device as defined in the following embodiment.

According to the fifteenth embodiment, there is provided an electrochemical device including a cathode, an anode and a separator interposed between the cathode and the anode, wherein the separator is the separator as defined in any one of the first to the tenth embodiments.

Advantageous Effects

According to an embodiment of the present disclosure, it is possible to provide a separator, which has excellent adhesion to an electrode and low resistance by using polyvinylidene fluoride-hexafluoropropylene block copolymer within a predetermined range, and a method for manufacturing the same.

BEST MODE

Figure 1:
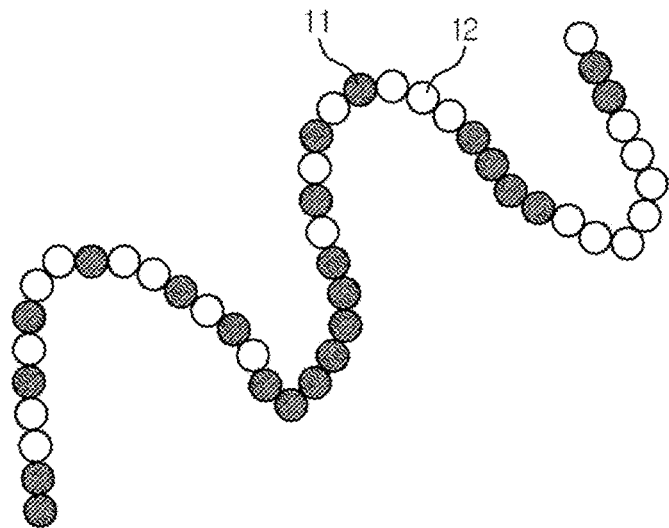
FIG. 1 is a schematic view illustrating the random copolymer according to Comparative Example.

Hereinafter, preferred embodiments of the present disclosure will be described in detail. It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

In an electrochemical device, such as a lithium secondary battery, an adhesive layer has been introduced sometimes onto a porous coating layer in order to increase the adhesion between a separator and an electrode. Herein, the adhesion between the porous polymer substrate and the porous coating layer is referred to as Peel Strength (Ps), and the adhesion between an electrode and the outermost surface (porous coating layer or adhesive layer) of the separator facing the electrode is referred to as Lami Strength (Ls).

According to the related art, polyvinyl fluoride-hexafluoropropylene has been used frequently as a binder polymer for the outermost layer of the separator facing the electrode in order to increase the adhesion to the electrode. However, in the case of the above-mentioned binder polymer, there is a problem in that it is required to reduce the content of hexafluoropropylene in order to enhance phase separation and to form an adhesive layer in a larger amount, resulting in degradation of solubility to the solvent and an increase in resistance.

However, as high-energy density and high-output electrochemical devices have been required, there is still a need for a separator which has excellent adhesion to an electrode and does not cause an increase in battery resistance.

The inventors of the present disclosure have conduced intensive studies to solve the above-mentioned problem, and found a separator, which uses the block copolymer as described hereinafter within a predetermined range, and thus shows excellent adhesion and a high swelling ratio with an electrolyte and has low resistance.

The separator according to an embodiment of the present disclosure includes: a porous polymer substrate; and a porous coating layer formed on at least one surface of the porous polymer substrate, and containing a plurality of inorganic particles and a binder polymer positioned on the whole or a part of the surface of the inorganic particles to connect the inorganic particles with one another and fix them; wherein the binder polymer includes a block copolymer including a first block having repeating units represented by the following Chemical Formula 1 and a second block having repeating units represented by the following Chemical Formula 2, and the content of the block copolymer is 50 parts by weight or more based on 100 parts by weight of the total content of the binder polymer:

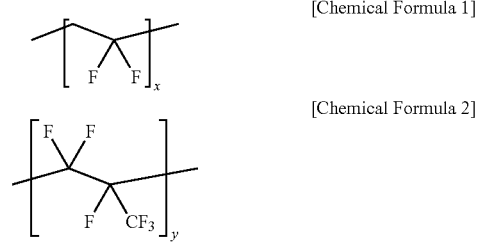

[Chemical Formula 1]

[Chemical Formula 2]

(wherein each of x and y independently represents an integer of 1 or more).

As used herein, 'polyvinylidene fluoride-hexafluoropropylene copolymer' refers to a block copolymer including the first block having vinylidene fluoride (VDF) units, i.e. repeating units represented by Chemical Formula 1, and the second block having hexafluoropropylene (HFP) units, i.e. repeating units represented by Chemical Formula 2.

Figure 2:
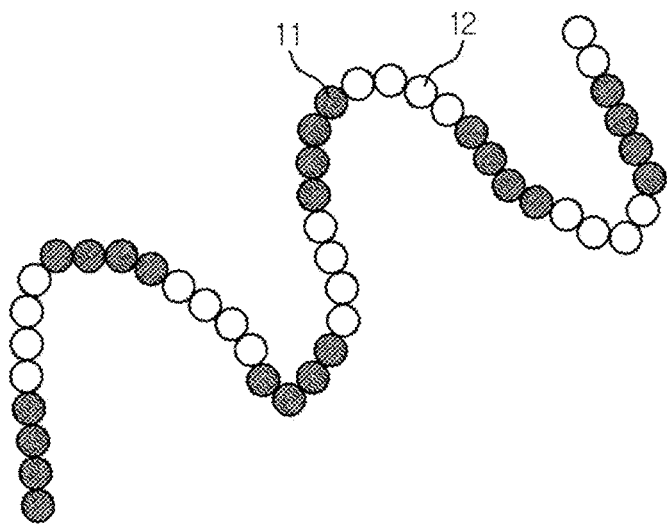
FIG. 2 is a schematic view illustrating the block copolymer according to an embodiment of the present disclosure.

The copolymer is shown in FIG. 2. For example, drawing numeral 11 in FIG. 2 may represent vinylidene fluoride and drawing numeral 12 may represent hexafluoropropylene. As shown in FIG. 2, the monomers may be distributed regularly along the polymer chain.

On the other hand, as shown in FIG. 1, 'random copolymer' may include vinylidene fluoride 11 and hexafluoropropylene 12 distributed randomly.

Herein, 'block copolymer' may be represented by the formula of $(AB)_n$.

In the above formula, n is an integer of 1 or more, preferably n is an integer larger than 1, such as 2, 3, 4, 5, 10, 15, 20, 30, 40, 50 or more, and A and B may be distributed regularly along the polymer chain.

For example, the block copolymer according to the present disclosure may be represented by the formula of AAA-AA-BBB-BB, wherein A may represent Chemical Formula 1 and B may represent Chemical Formula 2.

According to an embodiment of the present disclosure, the block copolymer may be represented by the formula of A-B-A-B-A-B-A-B-A-B.

According to another embodiment of the present disclosure, the block copolymer may be represented by the formula of AA-BB-AA-BB-AA-BB-AA-BB.

According to still another embodiment of the present disclosure, the block copolymer may be represented by the formula of AAAAA-B-AAAAA-B-AAAAA-B.

In other words, the block copolymer according to the present disclosure may have a structure in which specific repeating units, i.e. the first block and the second block, are connected to each other regularly and alternately.

According to the present disclosure, the block copolymer includes a block copolymer including the first block having repeating units represented by Chemical Formula 1 and the second block having repeating units represented by Chemical Formula 2, wherein the first block and the second block may be distributed in the following configuration.

In other words, the block copolymer is a copolymer obtained by repeating formation of the first block through the polymerization of the monomers having repeating units represented by Chemical Formula 1, and then formation of the second block through the polymerization of the monomers having repeating units represented by Chemical Formula 2. An embodiment of such copolymer is shown in FIG. 2 schematically.

The separator for an electrochemical device according to an embodiment of the present disclosure includes a porous coating layer on at least one surface of a porous polymer substrate, wherein the porous coating layer includes, as a binder polymer, a block copolymer including the first block having repeating units represented by Chemical Formula 1 and the second block having repeating units represented by Chemical Formula 2.

As described above, polyvinylidene fluoride-hexafluoropropylene copolymer has high solubility to an organic solvent and excellent adhesion, and thus has been used as a binder polymer for a separator for an electrochemical device.

When reducing the content of hexafluoropropylene in order to further increase the adhesion to an electrode in the separator using the copolymer, phase separation is improved, which is advisable for forming an adhesive layer. However, when reducing the content of hexafluoropropylene, volume swelling with an electrolyte is degraded to cause a problem of an increase in battery resistance.

According to the related art, the binder polymer was used regardless of its configuration.

However, according to an embodiment of the present disclosure, it has been found that when the block copolymer is used in the same amount as the total binder polymer content or more, it is possible to provide a separator which has excellent adhesion and shows high swelling with an electrolyte and low resistance. In other words, unlike the related art, the present disclosure is focused on the configuration of the binder polymer to overcome the limitation of the separator according to the related art.

According to an embodiment of the present disclosure, the block copolymer is used in an amount of 50 parts by weight or more based on 100 parts by weight of the total binder polymer content.

According to an embodiment of the present disclosure, the block copolymer may be used in an amount of 50 parts by weight or more, 55 parts by weight or more, 60 parts by weight or more, 65 parts by weight or more, or 70 parts by weight or more, and 100 parts by weight or less, 95 parts by weight or less, or 90 parts by weight or less, based on 100 parts by weight of the total binder polymer content.

To increase the adhesion to an electrode, an adhesive layer is formed through a phase separation process during the formation of a porous coating layer. It is required to reduce the content of hexafluoropropylene in order to form the adhesive layer in a larger amount by enhancing the phase separation. However, in this case, solubility to a solvent is decreased and resistance is increased undesirably.

To solve the above-mentioned problems, the inventors of the present disclosure have conducted intensive studies and found that resistance characteristics are varied with the configuration of polyvinylidene fluoride-hexafluoropropylene. In other words, when the binder polymer contained in the porous coating layer slurry has a configuration of polyvinylidene fluoride-hexafluoropropylene block copolymer, it is possible to maintain the content of hexafluoropropylene at an adequate level to facilitate phase separation, and to provide a higher volume swelling ratio with an electrolyte as compared to random copolymer. Thus, it can be seen that when the separator using the above-mentioned block copolymer is applied to a battery, the battery shows relatively lower resistance.

Therefore, the binder polymer may consist of the block copolymer alone. According to an embodiment of the present disclosure, the block copolymer may be 'polyvinylidene fluoride-hexafluoropropylene block copolymer'. In other words, polyvinylidene fluoride-hexafluoropropylene block copolymer free of random copolymer is used according to the present disclosure, considering the configuration of copolymer, while polyvinylidene fluoride-hexafluoropropylene copolymer is used as a binder polymer regardless of its configuration according to the related art.

According to the present disclosure, the block copolymer may be a copolymer polymerized from the first block and the second block at a weight ratio of the first block to the second block of 95:5-80:20. In other words, vinylidene fluoride monomer has a higher weight proportion. According to an embodiment of the present disclosure, the first block and the second block may be polymerized at a weight ratio of the first block to the second block of 95:5-80:20, or 90:10-85:15. When vinylidene fluoride monomer has a higher proportion as mentioned above, phase separation occurs well to facilitate formation of the adhesive layer. Thus, the adhesion between an electrode and the separator may be increased.

According to an embodiment of the present disclosure, the block copolymer may include the first block having a weight average molecular weight of 80,000-860,000 and the second block having a weight average molecular weight of 5,000-180,000 at a weight ratio of 95:5-80:20. When the block copolymer has the above-defined ranges of weight average molecular weight and weight ratio, it is possible to provide an adequate level of solubility to a solvent and affinity to an electrolyte, and to improve phase separation behavior against a non-solvent. Therefore, the block copolymer is advantageously and suitably used for a porous coating layer by virtue of high solubility to an organic solvent and excellent phase separation characteristics.

According to an embodiment of the present disclosure, the block copolymer may have a weight average molecular weight of 100,000 or more, 200,000 or more, 300,000 or more, or 400,000 or more. Within the above-defined range, the weight average molecular weight may be 900,000 or less, 800,000 or less, or 750,000 or less. When the block copolymer has a weight average molecular weight within the above-defined range, it shows an adequate level of solubility to an organic solvent and provides excellent physical properties.

In the electrode assembly according to an embodiment of the present disclosure, particular examples of the porous polymer substrate may include a porous polymer film substrate or a porous polymer non-woven web substrate.

The porous polymer film substrate may be a porous polymer film including polyolefin, such as polyethylene or polypropylene. Such a polyolefin porous polymer film substrate may realize a shut-down function at a temperature of 80-130° C.

Herein, the polyolefin porous polymer film may be formed of polymers including polyolefin polymers, such as polyethylene, including high-density polyethylene, linear low-density polyethylene, low-density polyethylene or ultrahigh-molecular weight polyethylene, polypropylene, polybutylene, or polypentene, alone or in combination.

In addition, the porous polymer film substrate may be obtained by molding various polymers, such as polyesters, other than polyolefins, into a film shape. Further, the porous polymer film substrate may have a stacked structure of two or more film layers, wherein each film layer may be formed of polymers including the above-mentioned polymers, such as polyolefins or polyesters, alone or in combination.

In addition, the porous polymer film substrate and porous nonwoven web substrate may be formed of polyethylene terephthalate, polybutylene terephthalate, polyester, polyacetal, polyamide, polycarbonate, polyimide, polyetherether ketone, polyether sulfone, polyphenylene oxide, polyphenylene sulfide, or polyethylene naphthalene, alone or in combination, besides the above-mentioned polyolefins Although there is no particular limitation in the thickness of the porous polymer substrate, the porous polymer substrate has a thickness of 1-100 μm, particularly 5-50 μm. Although there is no particular limitation in the size of the pores present in the porous substrate and porosity, the pore size and porosity may be 0.01-50 μm and 10-95%, respectively.

There is no particular limitation in the inorganic particles used for forming the porous coating layer, as long as they are electrochemically stable. In other words, there is no particular limitation in the inorganic particles that may be used herein, as long as they cause no oxidation and/or reduction in the range (e.g. 0-5V based on Li/Li$^+$) of operating voltage of an applicable electrochemical device. Particularly, when using inorganic particles having a high dielectric constant as the inorganic particles, it is possible to improve the ion conductivity of an electrolyte by increasing the dissociation degree of an electrolyte salt, such as a lithium salt, in a liquid electrolyte.

For the above-mentioned reasons, the inorganic particles may be inorganic particles having a dielectric constant of 5 or more, inorganic particles having lithium ion transportability or a mixture thereof.

The inorganic particles having a dielectric constant of 5 or more may include any one selected from the group consisting of $Al_2O_3$, $SiO_2$, $ZrO_2$, AlOOH, $TiO_2$, $BaTiO_3$, Pb(Zr,Ti)$O_3$ (PZT, wherein 0<x<1), $Pb_{1-x}La_xZr_{1-y}Ti_yO_3$ (PLZT, wherein 0<x<1, 0<y<1), $(1-x)Pb(Mg_{1/2}Nb_{2/3})O_{3-x}PbTiO_3$ (PMN-PT, wherein 0<x<1), hafnia ($HfO_2$), $SrTiO_3$, $SnO_2$, $CeO_2$, MgO, NiO, CaO, ZnO, $ZO_3$ and SiC, or a mixture of two or more of them.

The inorganic particles having lithium ion transportability may be any one selected from the group consisting of include lithium phosphate ($Li_3PO_4$), lithium titanium phosphate ($Li_xTi_y(PO_4)_3$, 0<x<2, 0<y<3), lithium aluminum titanium phosphate ($Li_xAl_yTi_z(PO_4)_3$, 0<x<2, 0<y<1, 0<z<3), $(LiAlTiP)_xO_y$-based glass (0<x<4, 0<y<13), lithium lanthanum titanate ($Li_xLa_yTiO_3$, 0<x<2, 0<y<3), lithium germanium thiophosphate ($Li_xGe_yP_zS_w$, 0<x<4, 0<y<1, 0<z<1, 0<w<5), lithium nitride ($Li_xN_y$, 0<x<4, 0<y<2), $SiS_2$-based glass ($Li_xSi_yS_z$, 0<x<3, 0<y<2, 0<z<4) and $P_2S_5$-based glass ($Li_xP_yS_z$, 0<x<3, 0<y<3, 0<z<7), or a mixture of two or more of them.

In addition, there is no particular limitation in the average particle diameter of the inorganic particles. However, the inorganic particles preferably have an average particle diameter of 0.001-10 μm in order to form a coating layer with a uniform thickness and to provide suitable porosity.

According to the present disclosure, the binder polymer used for forming the porous coating layer may further include a polymer used currently for forming a porous coating layer in the art, besides the above-mentioned polyvinylidene fluoride-hexafluoropropylene copolymer. Particularly, a polymer having a glass transition temperature ($T_g$) of −200 to 200° C. may be used. This is because such a polymer can improve the mechanical properties, such as flexibility and elasticity, of the finally formed porous coating layer. The binder polymer functions as a binder which connects the inorganic particles with one another and stably fixes them, and thus contributes to prevention of degradation of mechanical properties of a separator having a porous coating layer.

In addition, it is not essentially required for the binder polymer to have ion conductivity. However, when using a polymer having ion conductivity, it is possible to further improve the performance of an electrochemical device. Therefore, a binder polymer having a dielectric constant as high as possible may be used as the binder polymer. In fact, since the dissociation degree of a salt in an electrolyte depends on the dielectric constant of the solvent for the electrolyte, use of a polymer having a higher dielectric constant as the binder polymer can improve the salt dissociation degree in an electrolyte. The binder polymer may have a dielectric constant ranging from 1.0 to 100 (measured at a frequency of 1 kHz), particularly 10 or more.

In addition to the above-mentioned function, the binder polymer may be characterized in that it is gelled upon the impregnation with a liquid electrolyte and thus shows a high degree of swelling. Thus, the binder polymer has a solubility parameter (i.e., Hildebrand solubility parameter) of 15-45 $MPa^{1/2}$ or 15-25 $MPa^{1/2}$ and 30-45 $MPa^{1/2}$. Therefore, hydrophilic polymers having many polar groups may be used more frequently as compared to hydrophobic polymers, such as polyolefins. When the solubility parameter is less than 15 $MPa^{1/2}$ and more than 45 $MPa^{1/2}$, it is difficult for the binder polymer to be swelled with a conventional liquid electrolyte for a battery.

Non-limiting examples of the binder polymer may include polyvinylidene fluoride-co-trichloroethylene, polymethyl methacrylate, polyethylhexyl acrylate, polybutyl acrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethylpolyvinyl alcohol, cyanoethyl cellulose, cyanoethyl sucrose, pullulan and carboxymethyl cellulose.

According to an embodiment of the present disclosure, the weight ratio of the inorganic particles to the binder polymer may be 50:50-99:1, particularly 70:30-95:5. When the weight ratio of the inorganic particles to the binder polymer satisfies the above-defined range, it is possible to prevent the problem of a decrease in pore size and porosity of the resultant coating layer, caused by an increase in content of the binder polymer. It is also possible to solve the problem of degradation of peeling resistance of the resultant coating layer, caused by a decrease in content of the binder polymer.

According to an embodiment of the present disclosure, the porous coating layer may further include other additives, in addition to the above-described inorganic particles and binder polymer.

Although there is no particular limitation in the thickness of the porous coating layer, the porous coating layer may have a thickness of 1-10 μm, particularly 1.5-6 μm. In addition, the porous coating layer preferably has a porosity of 35-65% but is not limited thereto.

In addition to the block copolymer, the porous coating layer may further include other binder polymers used currently in the art in order to increase the binding force in the porous coating layer.

In the separator for an electrochemical device according to an embodiment of the present disclosure, the porous coating layer may include, on the surface thereof, an adhesive layer in which the block copolymer is distributed predominantly.

The adhesive layer may be formed by phase separation between a solvent and a non-solvent. Particularly, the adhesive layer is formed, while inorganic particles are introduced to and dispersed in a solvent containing a binder polymer dissolved therein, and then the resultant slurry is applied to and dried on a porous polymer substrate. Particularly, when the slurry for forming a porous coating layer is coated on the porous polymer substrate and then a humidifying process (exposure to a non-solvent) is carried out, pores are formed through the exchange between the solvent and the non-solvent.

Herein, as described above, the block copolymer according to the present disclosure maintains an adequate level of hexafluoropropylene content, and thus can retain high solubility to the solvent, while maintaining phase separation characteristics. This facilitates formation of the adhesive layer.

On the contrary, in the case of the binder polymer including random copolymer alone, solubility to the solvent may be decreased, when the weight ratio of hexafluoropropylene is reduced in order to improve phase separation characteristics. In addition, phase separation characteristics may be degraded, when the weight ratio of hexafluoropropylene is increased in order to maintain solubility to the solvent. Thus, it is difficult to form an adhesive layer.

The separator according to an embodiment of the present disclosure may be obtained by the conventional methods known to those skilled in the art. According to an embodiment of the present disclosure, slurry for forming a porous coating layer prepared by dispersing inorganic particles in a polymer dispersion containing a binder polymer dispersed therein may be applied to and dried on a porous substrate to form a porous coating layer. Herein, when a humidifying process is carried out during the drying, an adhesive layer may be formed. The solvent used herein preferably has a solubility parameter similar to the solubility parameter of the binder polymer to be used and a low boiling point in order to facilitate homogeneous mixing and the subsequent removal of the solvent. Non-limiting examples of the solvent that may be used include acetone, tetrahydrofuran, methylene chloride, chloroform, dimethyl formamide, N-methyl-2-pyrrolidone, methyl ethyl ketone, cyclohexane, or a mixture of two or more of them. The non-solvent may be used include water.

Although there is no particular limitation in the process for coating the slurry for forming a porous coating layer onto the porous substrate, a slot coating or dip coating process may be used preferably. A slot coating process includes coating a composition supplied through a slot die onto the whole surface of a substrate and is capable of controlling the thickness of a coating layer depending on the flux supplied from a metering pump. In addition, dip coating includes dipping a substrate into a tank containing a composition to carry out coating and is capable of controlling the thickness of a coating layer depending on the concentration of the composition and the rate of removing the substrate from the composition tank. Further, in order to control the coating thickness more precisely, it is possible to carry out post-metering through a Mayer bar or the like, after dipping.

Then, the porous substrate coated with the slurry for forming a porous coating layer is dried by using a dryer, such as an oven, thereby forming a porous coating layer on at least one surface of the porous substrate.

In the porous coating layers, the inorganic particles are bound among themselves by the binder polymer, while they are packed and are in contact with each other. Thus, interstitial volumes may be formed among the inorganic particles and the interstitial volumes may become vacant spaces to form pores.

In other words, the binder polymer attaches the inorganic particles to one another so that they may retain their binding states. For example, the binder polymer connects and fixes the inorganic particles with one another. In addition, the pores of the porous coating layer are those formed by the interstitial volumes among the inorganic particles which become vacant spaces. The space may be defined by the inorganic particles facing each other substantially in a closely packed or densely packed structure of the inorganic particles.

In still another aspect of the present disclosure, there is provided an electrochemical device including a cathode, an anode and a separator interposed between the cathode and the anode, wherein the separator is the above-described separator.

The electrochemical device includes any device which carries out electrochemical reaction, and particular examples thereof include all types of primary batteries, secondary batteries, fuel cells, solar cells or capacitors, such as super capacitor devices. Particularly, among the secondary batteries, lithium secondary batteries, including lithium metal secondary batteries, lithium ion secondary batteries, lithium polymer secondary batteries or lithium ion polymer batteries, are preferred.

The two electrodes, cathode and anode, used in combination with the separator according to the present disclosure are not particularly limited, and may be obtained by allowing electrode active materials to be bound to an electrode current collector through a method generally known in the art. Among the electrode active materials, non-limiting examples of a cathode active material include conventional cathode active materials that may be used for the cathodes for conventional electrochemical devices. Particularly, lithium manganese oxides, lithium cobalt oxides, lithium nickel oxides, lithium iron oxides or lithium composite oxides containing a combination thereof are used preferably. Non-limiting examples of an anode active material include conventional anode active materials that may be used for the anodes for conventional electrochemical devices. Particularly, lithium-intercalating materials, such as lithium metal or lithium alloys, carbon, petroleum coke, activated carbon, graphite or other carbonaceous materials, are used preferably. Non-limiting examples of a cathode current collector include foil made of aluminum, nickel or a combination thereof. Non-limiting examples of an anode current collector include foil made of copper, gold, nickel, nickel alloys or a combination thereof.

The electrolyte that may be used in the electrochemical device according to the present disclosure is a salt having a structure of $A^+B^-$, wherein $A^+$ includes an alkali metal cation such as $Li^+$, $Na^+$, $K^+$ or a combination thereof, and $B^-$ includes an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ or a combination thereof, the salt being dissolved or dissociated in an organic solvent including propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone (γ-butyrolactone) or a combination thereof. However, the present disclosure is not limited thereto.

Injection of the electrolyte may be carried out in an adequate step during the process for manufacturing a battery depending on the manufacturing process of a final product and properties required for a final product. In other words, injection of the electrolyte may be carried out before the assemblage of a battery or in the final step of the assemblage of a battery.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Example 1

1) Manufacture of Anode

An anode active material (artificial graphite), a conductive material (carbon black), a dispersing agent (carboxymethyl cellulose, CMC) and a binder polymer resin (polyvinylidene fluoride, PVdF) were mixed with water at a weight ratio of 95.8:1:1:2.2 to obtain anode slurry. The anode slurry was coated on copper (Cu) foil to a thickness of 50 μm to form a thin electrode plate, which, in turn, was dried at 135° C. for 3 hours or more and then pressed to obtain an anode.

2) Manufacture of Cathode

A cathode active material ($LiCoO_2$), a conductive material (carbon black) and a binder polymer (PVdF) were introduced to N-methyl-2-pyrrolidone (NMP) at a weight ratio of 96:2:2, followed by mixing, to obtain cathode slurry. The cathode slurry was coated on aluminum foil having a thickness of 20 μm at a capacity of 3.1 $mAh/cm^2$ to obtain a cathode.

3) Manufacture of Separator $Al_2O_3$ inorganic particles (Japan Light Metal Co., LS235, particle size 500 nm) and the binder polymer as described hereinafter were introduced to water at room temperature and agitated to prepare homogeneously dispersed slurry. The binder polymer is a polyvinylidene fluoride-hexafluoropropylene block copolymer (LBG available from Alkema Co.) having a weight average molecular weight of 570,000 and a weight ratio of vinylidene fluoride to hexafluoropropylene of 95:5. Meanwhile, vinylidene fluoride monomer and hexafluoropropylene monomer have a weight average molecular weight of 540,000 and 30,000, respectively.

The inorganic particles and the binder polymer were used at a weight ratio of 80:20.

Particularly, the block copolymer was introduced to acetone and dissolved therein, and the inorganic particles were introduced thereto to prepare slurry for forming a porous coating layer.

The slurry for forming a porous coating layer was applied to one surface of a polyethylene porous substrate (WL11B available from W scope Co., air permeation time 150 sec/100 cc) at 10 $g/m^2$, and then dried under a relative humidity of 40% at room temperature (25° C.). The porous coating layer had a thickness of 4 μm.

4) Manufacture of Electrochemical Device

The separator was interposed between the cathode and the anode, and then pressing was carried out at a temperature of 90° C. under 8.5 MPa for 1 second. Then, an electrolyte was injected thereto to obtain a lithium secondary battery as an electrochemical device.

Example 2

A lithium secondary battery was obtained in the same manner as Example 1, except that 3) Manufacture of Separator was carried out as follows.

Particularly, the binder polymer introduced to the dispersed slurry was prepared as described hereinafter.

Polyvinylidene fluoride-hexafluoropropylene block copolymer (LBG available from Alkema) having a weight average molecular weight of 570,000 and a weight ratio of vinylidene fluoride to hexafluoropropylene of 95:5 was used. Meanwhile, vinylidene fluoride monomer and hexafluoropropylene monomer have a weight average molecular weight of 540,000 and 30,000, respectively.

Polyvinylidene fluoride-hexafluoropropylene random copolymer prepared by solution polymerization using a free radical initiator, diisopropyl peroxydicarbonate (DIPPDC, Hosung Chemex Co.), was used. To a reactor cooled to a low temperature of −30° C., $CFC_{12}CF_2Cl$ (99%, R-113, Aldrich Co.) as a solvent and an initiator (DIIPDC) were introduced at a volume ratio of 300:1. Then, the reactor was maintained under nitrogen atmosphere. While the reactor was agitated at a speed of 200 rpm with a magnetic agitator, vinylidene fluoride ($CH_2$=$CF_2$, 98%, Apollo scientific Co.) and hexafluoropropylene ($CF_3CF$=$CF_2$, 99%, 3M Co.) were further introduced at a weight ratio of 90:10 to carry out polymerization. After the completion of the polymerization, the solvent was removed, and the product was washed with alcohol and dried at 60° C. for 24 hours to obtain polyvinylidene fluoride-hexafluoropropylene random copolymer. The binder polymer was polyvinylidene fluoride-hexafluoropropylene random copolymer having a weight average molecular weight of 570,000 and a weight ratio of vinylidene fluoride to hexafluoropropylene of 95:5. In addition, vinylidene fluoride monomer and hexafluoropropylene monomer have a weight average molecular weight of 540,000 and 30,000, respectively.

Herein, the weight ratio of random copolymer to block copolymer was 30:70.

Example 3

A lithium secondary battery was obtained in the same manner as Example 2, except that the weight ratio of random copolymer to block copolymer was 50:50.

Comparative Example 1

In Comparative Example 1, random copolymer was used alone.

Particularly, an electrochemical device was obtained in the same manner as Examples, except that the binder polymer contained in the slurry for forming a porous coating layer was prepared as described hereinafter.

Polyvinylidene fluoride-hexafluoropropylene random copolymer was prepared by solution polymerization using a free radical initiator, diisopropyl peroxydicarbonate (DIPPDC, Hosung Chemex Co.). To a reactor cooled to a low temperature of −30° C., $CFC_{12}CF_2Cl$ (99%, R-112, Aldrich Co.) as a solvent and an initiator (DIIPDC) were introduced at a volume ratio of 300:1, and the reactor was maintained under nitrogen atmosphere.

While the reactor was agitated at a speed of 200 rpm with a magnetic agitator, vinylidene fluoride ($CH_2$=$CF_2$, 98%, Apollo scientific Co.) and hexafluoropropylene ($CF_3CF$=$CF_2$, 99%, 3M Co.) were further introduced at a weight ratio of 90:10 to carry out polymerization.

After the completion of the polymerization, the solvent was removed, and the product was washed with alcohol and dried at 60° C. for 24 hours to obtain polyvinylidene fluoride-hexafluoropropylene random copolymer.

The binder polymer was polyvinylidene fluoride-hexafluoropropylene random copolymer having a weight average molecular weight of 570,000 and a weight ratio of vinylidene fluoride to hexafluoropropylene of 95:5. In addition, vinylidene fluoride monomer and hexafluoropropylene monomer have a weight average molecular weight of 540,000 and 30,000, respectively.

Comparative Example 2

A lithium secondary battery was obtained in the same manner as Example 2, except that the weight ratio of random copolymer to block copolymer was 70:30.

Test Examples

The physical properties of each of the separators according to Examples and Comparative Examples were evaluated by the following methods. The results are shown in the following Table 1, FIG. 3 and FIG. 4.

1) Determination of Permeability

The permeability was determined by using a Gurley type air permeability tester according to JIS P-8117. Herein, the time required for 100 mL of air to pass through a diameter of 28.6 mm and an area of 645 mm² was measured. The results are shown in Table 1.

2) Determination of Resistance

Each of the separators according to Examples and Comparative Examples was impregnated with an electrolyte and the resistance was measured. The resistance was determined by using 1M LiPF$_6$-ethylene carbonate/ethyl methyl carbonate (weight ratio 3:7) as an electrolyte at 25° C. through an alternate current process. The results are shown in Table 1.

5) Determination of Initial Discharge Resistance

Each of the electrochemical devices according to Examples and Comparative Examples was discharged in SOC 30 at 2.5 C rate for 10 seconds, and the resistance was determined by using Electrochemical Analyzer available from Solartron Co. The results are shown in Table 1 and FIG. 3.

6) Determination of Volume Swelling Ratio of Porous Coating Layer with Electrolyte Each of the electrochemical devices according to Examples and Comparative Examples was impregnated with 1M LiPF$_6$-ethylene carbonate/ethyl methyl carbonate (weight ratio 3:7) as an electrolyte, and then the volume swelling ratio of the separator before and after the injection of the electrolyte was determined. The results are shown in Table 1 and FIG. 4.

TABLE 1

|  | Weight ratio of random copolymer to block copolymer | Permeability (sec/100 mL) | Resistance (ohm) | Peel Strength (gf/15 mm) | | Lami Strength (gf/15 mm) | |
| --- | --- | --- | --- | --- | --- | --- | --- |
|  |  |  |  | top | back | top | back |
| Ex. 1 | 0:100 | 305 | 0.90 | 185 | 210 | 45 | 41 |
| Ex. 2 | 30:70 | 307 | 0.95 | 189 | 205 | 46 | 41 |
| Ex. 3 | 50:50 | 309 | 1.00 | 190 | 209 | 43 | 42 |
| Comp. Ex. 1 | 100:0 | 320 | 1.15 | 200 | 225 | 41 | 39 |
| Comp. Ex. 2 | 70:30 | 320 | 1.13 | 200 | 220 | 40 | 40 |

3) Determination of Adhesion Between Porous Polymer Substrate and Porous Coating Layer (Peel Strength)

Each of the separators according to Examples and Comparative Examples was cut into a size of 15 mm×100 mm. A double-sided adhesive tape was attached to a glass plate and the porous coating layer surface of the separator was attached to the adhesive tape. Then, the end portion of the separator was mounted to a UTM instrument (LLOYD Instrument LF Plus), and force was applied at 180° and a rate of 300 mm/min. The force required for separating the porous coating layer from the porous polymer substrate was measured. The results are shown in Table 1.

4) Determination of Adhesion Between Electrode and Separator (Lami Strength)

An anode was manufactured in the same manner as Example 1-1) and cut into a size of 25 mm×100 mm. Each of the separators according to Example 1 and Comparative Example 1 was cut into a size of 25 mm×100 mm. The separator was stacked with the anode, and the stack was inserted between PET films having a thickness of 100 μm and adhered by using a flat press. Herein, the flat press was heated and pressurized at 70° C. under a pressure of 600 kgf for 1 second. The adhered separator and anode were attached to slide glass by using a double-sided tape. The end portion (10 mm or less from the end of the adhered surface) of the separator was peeled off and attached to a 25 mm×100 mm PET film by using a single-sided tape so that they might be connected in the longitudinal direction. Then, the slide glass was mounted to the lower holder of a UTM instrument (LLOYD Instrument LF Plus), and the PET film adhered to the separator was mounted to the lower holder of the UTM instrument. Then, force was applied at 180° and a rate of 300 mm/min. The force required for separating the anode from the porous coating layer facing the anode was measured. The results are shown in Table 1.

As can be seen from Table 1, Example 1 shows lower permeability and lower resistance as compared to Comparative Example 1.

Figure 3:
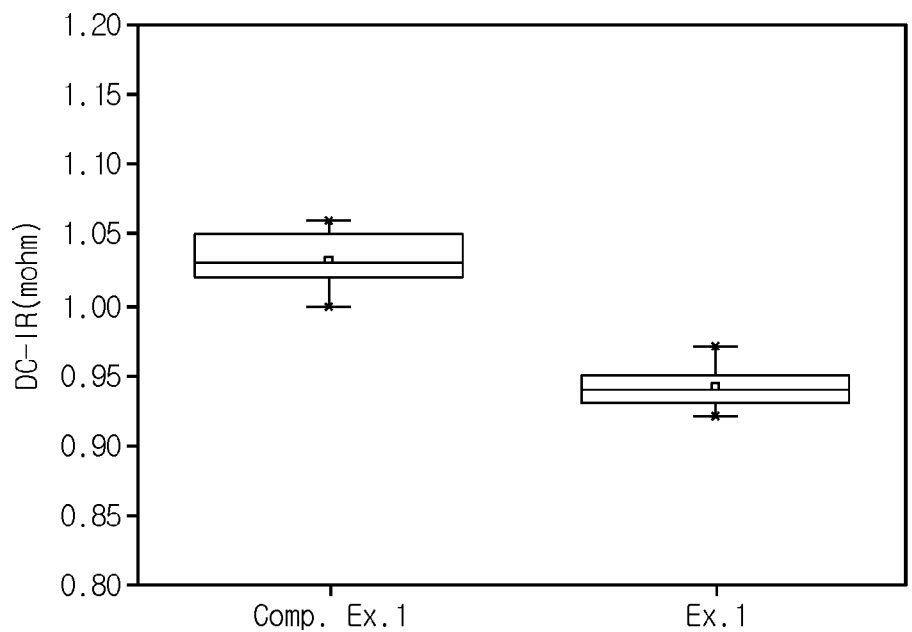
FIG. 3 shows the initial discharge resistance characteristics of each of the separators according to an embodiment of the present disclosure and Comparative Example.

As can be seen from FIG. 3, Example 1 shows higher initial discharge resistance characteristics as compared to Comparative Example 1.

Figure 4:
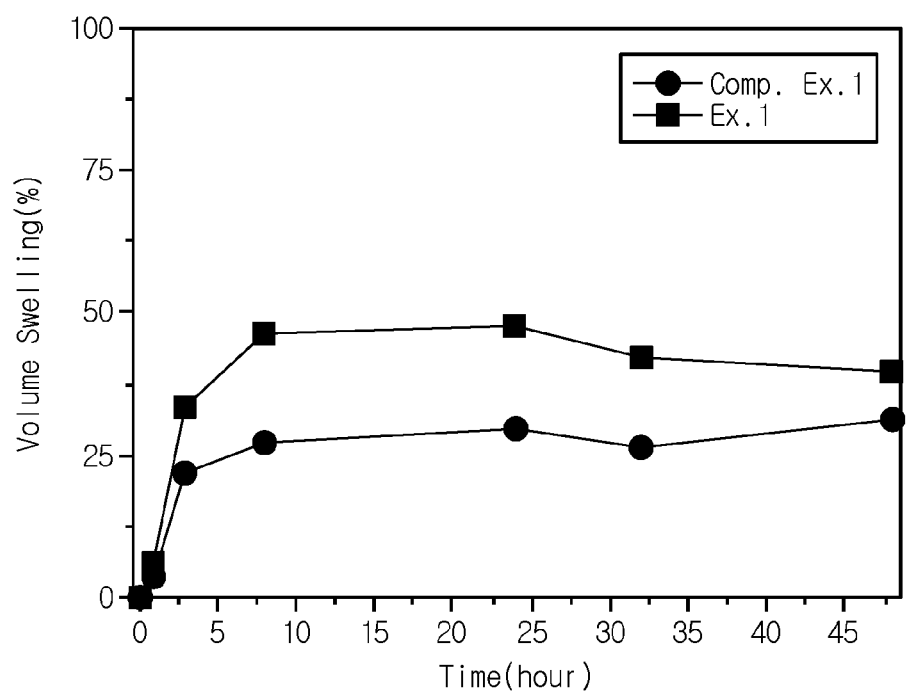
FIG. 4 is a graph illustrating the volume swelling ratio with a solvent of each of the separators according to an embodiment of the present disclosure and Comparative Example.

As can be seen from FIG. 4, at the same content of hexafluoropropylene, the binder film used in Example 1 shows a higher volume swelling ratio with an electrolyte, as compared to the binder film used in Comparative Example 1. In other words, when using the block copolymer according to an embodiment of the present disclosure, it is possible to provide a separator having relatively lower resistance by virtue of a higher volume swelling ratio with the electrolyte.

What is claimed is:

1. A separator for an electrochemical device comprising:
a porous polymer substrate; and
a porous coating layer formed on at least one surface of the porous polymer substrate,
wherein the porous coating layer comprises inorganic particles and a binder polymer positioned on at least a part of a surface of individual inorganic particles to connect and fix the inorganic particles with one another,
wherein the binder polymer comprises a block copolymer consisting of a first block having repeating units represented by Chemical Formula 1 and a second block having repeating units represented by Chemical Formula 2, and
wherein a content of the block copolymer is 50 parts by weight or more based on 100 parts by weight of a total content of the binder polymer:

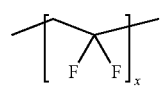

[Chemical Formula 1]

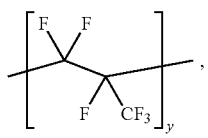

wherein each of x and y independently represents an integer of 1 or more, wherein a weight ratio of the inorganic particles to the binder polymer is 70:30 to 99:1.

2. The separator for the electrochemical device according to claim 1, wherein the binder polymer is the block copolymer.

3. The separator for the electrochemical device according to claim 1, wherein the block copolymer is a copolymer polymerized from the first block and the second block at a weight ratio of the first block to the second block of 95:5 to 80:20.

4. The separator for the electrochemical device according to claim 1, wherein the block copolymer is a copolymer polymerized from the first block and the second block at a weight ratio of the first block to the second block of 95:5 to 90:10.

5. The separator for the electrochemical device according to claim 1, wherein the block copolymer has a weight average molecular weight of 100,000 to 900,000.

6. The separator for the electrochemical device according to claim 1, wherein the block copolymer has a weight average molecular weight of 570,000 to 900,000.

7. The separator for the electrochemical device according to claim 1, wherein the block copolymer consists of the first block having a weight average molecular weight of 540,000 to 860,000 and the second block having a weight average molecular weight of 30,000 to 180,000 at a weight ratio of the first block to the second block of 95:5 to 90:10.

8. The separator for the electrochemical device according to claim 1, wherein the porous polymer substrate is a polyolefin-based porous polymer film substrate or a porous polymer non-woven web substrate.

9. The separator for the electrochemical device according to claim 8, wherein the polyolefin-based porous polymer film substrate comprises at least one of polyethylene, polypropylene, polybutylene, or polypentene.

10. An electrochemical device comprising:
a cathode;
an anode; and
a separator interposed between the cathode and the anode, wherein the separator is the separator as defined in claim 1.

11. A method for manufacturing a separator for an electrochemical device, comprising the steps of:
(S1) preparing a porous polymer substrate; and
(S2) applying slurry for forming a porous coating layer comprising an organic solvent, a plurality of inorganic particles and a binder polymer onto at least one surface of the porous polymer substrate, and drying the porous polymer substrate coated with the slurry to form a porous coating layer, wherein the binder polymer comprises a block copolymer consisting of a first block having repeating units represented by Chemical Formula 1 and a second block having repeating units represented by Chemical Formula 2, and wherein a content of the block copolymer is 50 parts by weight or more based on 100 parts by weight of a total content of the binder polymer:

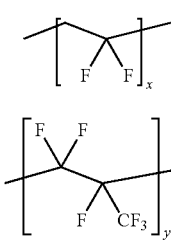

wherein each of x and y independently represents an integer of 1 or more, wherein a weight ratio of the inorganic particles to the binder polymer is 70:30 to 99:1.

12. The method for manufacturing the separator for the electrochemical device according to claim 11, wherein the binder polymer is the block copolymer.

13. The method for manufacturing the separator for the electrochemical device according to claim 11, wherein the block copolymer is a copolymer polymerized from the first block and the second block at a weight ratio of the first block to the second block of 95:5 to 80:20.

14. The method for manufacturing the separator for the electrochemical device according to claim 11, wherein the organic solvent comprises at least one of acetone, tetrahydrofuran, methylene chloride, chloroform, dimethyl formamide, N-methyl-2-pyrrolidone, methyl ethyl ketone, or cyclohexane.

* * * * *